UNITED STATES PATENT OFFICE.

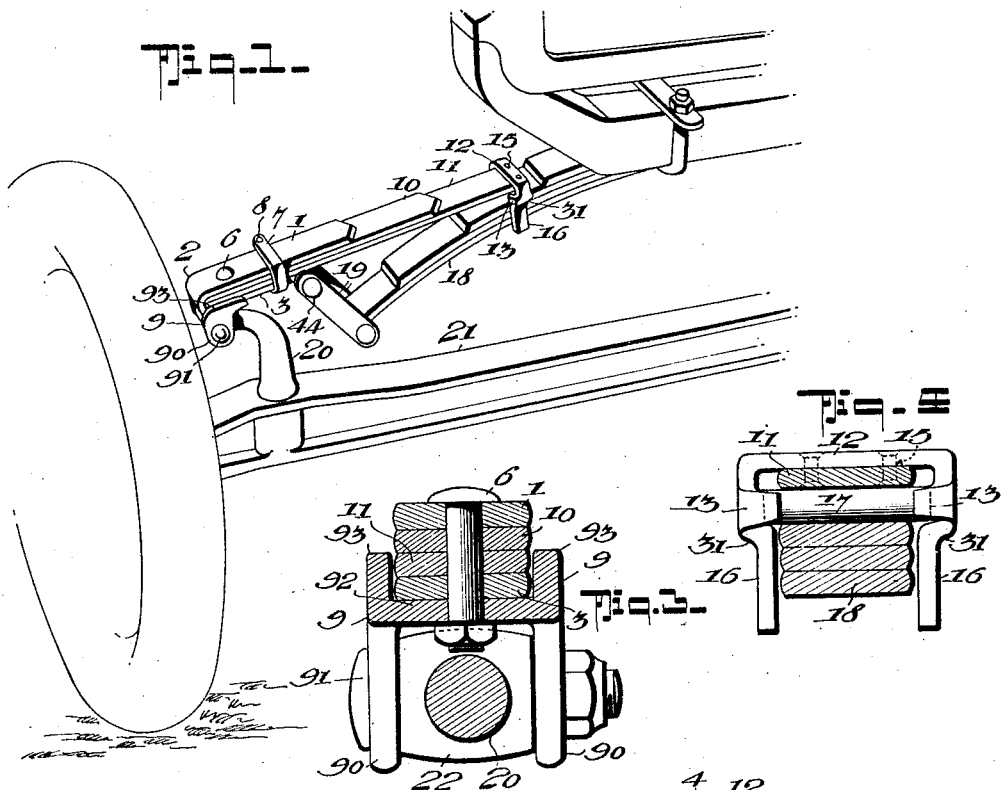

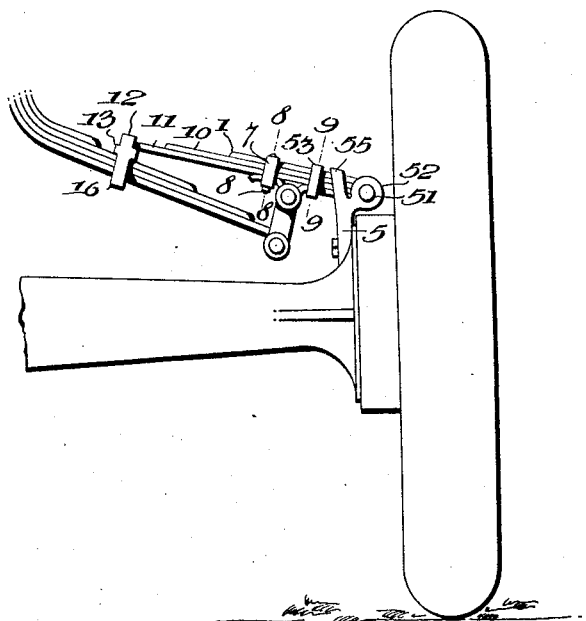
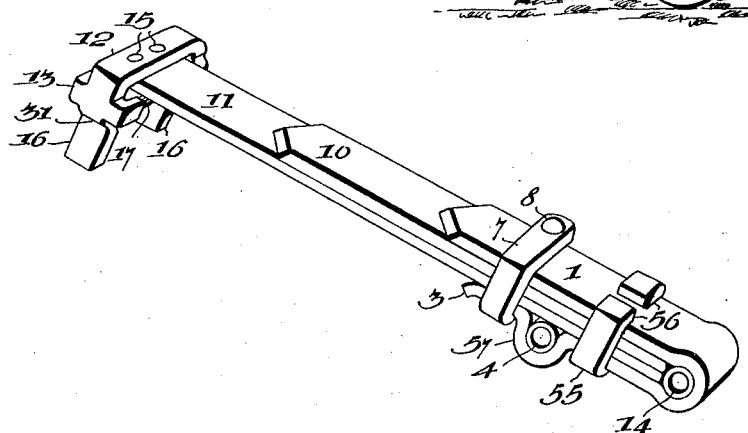
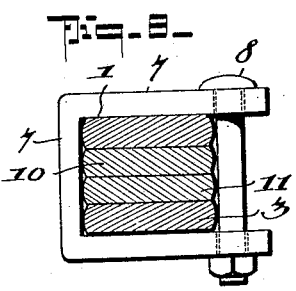
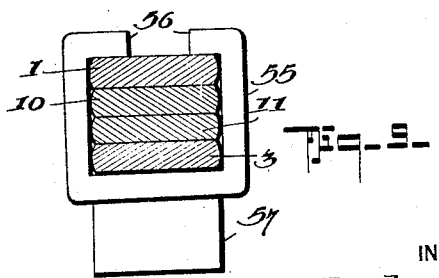

CHARLES A. WIBERG AND VICTOR B. WIBERG, OF DULUTH, MINNESOTA, ASSIGNORS TO WIBERG MANUFACTURING COMPANY, A CORPORATION OF MINNESOTA.

SPRING SHOCK ABSORBER.

1,406,706.  Specification of Letters Patent.  Patented Feb. 14, 1922.

Application filed February 7, 1920. Serial No. 356,824.

*To all whom it may concern:*

Be it known that we, CHARLES A. WIBERG and VICTOR B. WIBERG, citizens of the United States, residing at Duluth, in the county of St. Louis and State of Minnesota, have invented certain new and useful Improvements in Spring Shock Absorbers, of which the following is a specification.

Our invention has reference to that type of spring shock absorbing means for motor vehicles, in which an auxiliary spring is held in suspension between the main vehicle spring and the axle or body of the vehicle and whose function is to aid the main spring to cushion the vehicle against the unevenness of road and which so cooperates in connection with the said main spring that it acts as a positive rebound check and protects the main spring from undue or breaking strains.

Another object of our invention is to provide an improved construction of vehicle spring suspension or shock absorber in which the auxiliary spring devices and their connections with the axle and the main spring are so designed that they are positively held against side thrusts, which operate automatically and permit the desired free play of the flexible part of the spring, which do not tip on short turns or curves and which can be readily installed in connection with the conventional type of vehicle main springs now in use.

With other minor objects in view that will appear as the construction and operation of our invention becomes better understood from the following detailed description and claims, our invention consists in the peculiar construction and combination of parts hereinafter described, reference being had to the accompanying drawings, in which:

Figure 1 is a perspective view of our shock absorber, so much of a motor vehicle and its front axle being shown to illustrate a practical application thereof.

Figure 2 is a vertical longitudinal section of one of our shock absorber devices, a portion of the front axle and a portion of the main spring being also shown.

Figures 3 and 4 are detail transverse sections of parts of the shock absorber devices, taken on the lines 3—3 and 4—4, respectively, on Figure 2.

Figure 5 is a perspective view of one of the auxiliary spring members hereinafter specifically referred to.

Figure 6 is a rear elevation of our shock absorber arranged for use with the rear main spring and axle.

Figure 7 is a perspective view of the modified arrangement of our shock absorber shown in Figure 6.

Figures 8 and 9 are detail cross sections thereof on the lines 8—8 and 9—9, respectively, on Figure 6.

In the practical development of our improved shock absorber and when particularly designed for use in connection with the front axle and the front main spring, the parts are arranged as shown in Figures 1 to 5.

Referring now more particularly to Figures 2 and 3, 21 designates the front axle and 18 one end of the front main spring.

10 and 11 designate the leaves that constitute a part of the auxiliary spring, the construction of which, excepting the particular manner in which they are connected with the perch 20 (or bracket 5 hereinafter referred to) and the main spring, is of the conventional form and constitutes no part of our invention.

9 designates a rocker connection that joins the outer end of the auxiliary spring with the perch 20 and, in the present arrangement, the said rocker has pendent apertured ears 90—90 that straddle the outturned end 22 of the perch and which receive a pivot bolt 91 that passes through the said outturned end 22, as shown.

Rocker 9 also includes a flat bearing which extends inwardly and constitutes a seat for receiving a special form of leaf 1 that constitutes a part of the auxiliary spring.

It will be noticed from the drawings, the leaf 1 makes the upper leaf of the auxiliary spring and it is formed into a loop 2 that extends over the outer ends of the spring members 10 and 11 and the said spring 1 bends back, as at 3, and extends under the said spring members 10 and 11 and rests upon the seat bearing 92, upon which it is held against lateral displacement or sidewise tilting by the opposite upturned flanges 93—93 of the rocker to which the outer ends of the spring members 10 and 11 and the looped upper end are rigidly held by a bolt 6 that passes down through the said parts and is secured by a nut as is clearly shown in Figure 3.

To further hold the spring members 1 in line with the members 10 and 11 and unite the spring leaves at a point of their greatest strain, a U-shaped clip 7 is provided that embraces the said parts 10, 11, 1 and 3 and is secured by a bolt 8.

The innermost end of the spring member 3 ends in a turned loop 30 in which is held a bushing 4 that receives the tie or pivot bolt 44 which secures the upper ends of links 19—19 that flexibly connect the ends of the main spring with the auxiliary spring, a tie bolt connecting the lower end of the links 19 with the looped and bushing equipped end of the main spring, as is best shown in Figure 2.

In our arrangement of shock absorber, the inner end of the auxiliary spring is attached to the main spring by a roller bearing connection, the construction of which is best shown in Figures 2 and 4, in which 12 designates a substantially U-shaped clamp, the upper cross member of which is fixedly secured, by rivets 15—15, to the inner end of the spring leaf 11.

At the opposite ends of the cross member, the pendent clamp portions 16 are formed with inwardly bent ears 13, which ears in connection with the inturned shoulders 31—31 constitute pockets for loosely receiving the opposite ends of a bearing roller 17 which rides upon the main spring and is engaged by the outer end of the leaf 10 of the auxiliary spring and is held against accidental displacement by the inturned ears 13.

The pendent members 16 of the clamp 12 straddle and form guides for holding the inner end of the auxiliary spring in alignment with the main spring on which the roller 17 travels, as the springs expand and contract, it being understood that the roller bearing connection permits free flexure of the main spring and at the same time, provides a simple, practical and convenient means for attaching the free end of the auxiliary spring to the main spring.

In the somewhat modified arrangement of our shock absorber shown in Figures 6 to 9 and which is designed for use in connection with the rear axle and rear main spring of the vehicle, the same general construction shown in Figures 1 to 5 is present.

In this latter arrangement, however, the outer end of the auxiliary spring is attached to a bracket 5 that is secured to the brake drum, as shown.

In this latter construction, the spring member 1 has its looped ends formed to hold a bushing 14 in which is received a pivot bolt 51 that passes through ears 52 on the brackets 5 and to rigidly hold the inner end of the auxiliary spring, the said bracket 5 is also formed with inturned lugs 53 (see Figure 6) that hook over the top of the spring member 1, and instead of using a bolt 6 for holding the parts together, as in the front auxiliary spring connections, a U-shaped clamp 55 extends over the members 1, 3, 10 and 11 and has inturned portions 56 that fit over the opposite edges of the top spring member 1, as is clearly shown in Figures 6 and 8.

In this modified form of our shock absorber, the spring member 3 instead of having a loop 30 at the inner end for receiving a bushing 4, is bent to form a practically semi-circular loop 57 in which is received the bushing 4 and the inner end of the member 3 is secured to the other spring members 10, 11 and 1 by a clamp similar to the clamp 7 in the front auxiliary spring connection.

The roller bearing connections that join the inner end of the rear auxiliary spring are the same as is used for the main auxiliary spring.

From the foregoing description taken in connection with the drawings, the complete construction, the manner of the application and the advantages of our construction of shock absorbing devices will be readily apparent to those familiar with the use of motor vehicle attachments of the character hereinbefore generally referred to.

What we claim is:

1. In a shock absorber of the character described, the combination with a support on the vehicle and a main spring; of an auxiliary spring disposed above and in the longitudinal plane of the main spring and whose inner end has slidable contact with the said main spring, a bearing rockably mounted on the aforesaid support onto which the outer end of the auxiliary spring is fixedly seated and a flexible connection that joins with the outer end of the main spring and with the auxiliary spring adjacent its seat connection, the said auxiliary spring including a loop-shaped member at the outer end fixedly secured to the other members of the said auxiliary spring, the bottom portion of the said loop-shaped spring member having a transverse bearing and a bolt that engages the said bearing and the adjacent end of the flexible connection that joins with the main spring.

2. In a shock absorber of the character described, the combination with the main spring and a support on the vehicle; of an auxiliary or suspension spring which includes a loop-shaped member that fits over the adjacent outer ends, top and bottom portions of the other members of the said auxiliary spring, the inner end of the said auxiliary spring being adapted for slidably engaging with the top portion of the main spring, means rockably connecting the outer end of the auxiliary spring with the aforesaid support on the vehicle, and link connections that join with the outer end of the main spring and with the auxiliary spring adjacent the outer or rockably mounted end thereof, the means for rockably connecting the auxiliary spring with the support on the vehicle consisting of a bracket having pendent bifurcated portions, an inwardly extended horizontal seat portion having upturned flanges for engaging the opposite sides of the adjacent auxiliary spring members and a clamping bolt that takes through the said adjacent spring members and the seat of the bracket.

3. As a new article of manufacture, an auxiliary spring comprising a main leaf, a supplemental leaf and a looped leaf, said looped leaf adapted to receive one end of each of said main and supplemental leaves, means for securing said leaves in a pack, said looped leaf being bent to form a bushing holder, and means at the free end of said main leaf for embracing another spring pack.

4. As a new article of manufacture, an auxiliary spring comprising a plurality of flat leaves, one of said leaves constituting a main leaf, another of said leaves being doubled back upon itself to receive the adjacent end of the remaining leaves, said bent back leaf having a loop at the adjacent ends of the remaining leaves, a bushing in said loop, said bent back leaf also having a second loop located at a position intermediate the ends of the pack end, a bushing in said intermediate loop and means for holding said spring leaves in a pack.

5. As a new article of manufacture, an auxiliary spring comprising a plurality of flat leaves, one of said leaves constituting a main leaf, another of said leaves being doubled back upon itself to receive the adjacent end of the remaining leaves, said bent back leaf having a loop at the adjacent ends of the remaining leaves, a bushing in said loop, said bent back leaf also having a second loop located at a position intermediate the ends of the pack end, a bushing in said intermediate loop and means for holding said spring leaves in a pack, a substantially U-shaped member secured to the free end of said main leaf and having lugs to form a bearing roller retaining means and a bearing roller held in said retaining means.

CHARLES A. WIBERG.
VICTOR B. WIBERG.